US008348478B2

(12) United States Patent
Pelton et al.

(10) Patent No.: US 8,348,478 B2
(45) Date of Patent: Jan. 8, 2013

(54) LIGHT MODULE

(75) Inventors: Bruce Pelton, Laguna Niguel, CA (US); Olaf Leijnse, Asten (NL); Jasper Van Der Krogt, Hertogenbosch (NL); Matthew Edward Mostoller, Hummelstown, PA (US); Robert D. Rix, Hershey, PA (US); Erik Derks, Schijndel (NL)

(73) Assignees: Tyco Electronics Nederland B.V., AR's-Hertogenbosch (NL); Tyco Electronics Corporation, Berwyn, PA (US)

( * ) Notice: Subject to any disclaimer, the term of this patent is extended or adjusted under 35 U.S.C. 154(b) by 112 days.

(21) Appl. No.: 12/870,472

(22) Filed: Aug. 27, 2010

(65) Prior Publication Data

US 2012/0051068 A1 Mar. 1, 2012

(51) Int. Cl.
*B60Q 1/06* (2006.01)

(52) U.S. Cl. .............. 362/373; 362/311.02; 362/311.13; 362/231

(58) Field of Classification Search .................. 362/373, 362/311.02, 311.13, 231
See application file for complete search history.

(56) References Cited

U.S. PATENT DOCUMENTS

| | | | | |
|---|---|---|---|---|
| 4,999,750 | A * | 3/1991 | Gammache | 362/203 |
| 6,666,689 | B1 * | 12/2003 | Savage, Jr. | 439/56 |
| 7,540,761 | B2 * | 6/2009 | Weber et al. | 439/487 |
| 2006/0262544 | A1 * | 11/2006 | Piepgras et al. | 362/373 |
| 2008/0130308 | A1 * | 6/2008 | Behr et al. | 362/507 |
| 2008/0316733 | A1 * | 12/2008 | Spartano et al. | 362/105 |
| 2010/0135022 | A1 * | 6/2010 | Deguara | 362/249.06 |
| 2011/0194292 | A1 * | 8/2011 | Tsai | 362/311.02 |

* cited by examiner

*Primary Examiner* — Evan Dzierzynski

(57) ABSTRACT

A light module includes a light engine that has an LED package having power terminals. A base ring assembly holds the light engine. The base ring assembly has a base ring configured to be mounted to a supporting structure. The base ring has a securing feature. The base ring assembly has a contact holder that holds power contacts. The power contacts are spring biased against the power terminals to create a separable power connection with the power terminals. A top cover assembly is coupled to the base ring. The top cover assembly has a collar surrounding the base ring. The top cover assembly has a securing feature that engages the securing feature of the base ring to couple the collar to the base ring. The collar has a cavity and the optical component is received in the cavity. The optical component is positioned to receive light from the LED package and the optical component is configured to emit the light generated by the LED package.

20 Claims, 9 Drawing Sheets

LIGHT MODULE

BACKGROUND OF THE INVENTION

The subject matter herein relates generally to solid state lighting systems and, more particularly, to a light emitting diode (LED) light module.

Solid-state light lighting systems use solid state light sources, such as light emitting diodes (LEDs), and are being used to replace other lighting systems that use other types of light sources, such as incandescent or fluorescent lamps. The solid-state light sources offer advantages over the lamps, such as rapid turn-on, rapid cycling (on-off-on) times, long useful life span, low power consumption, narrow emitted light bandwidths that eliminate the need for color filters to provide desired colors, and so on.

Solid-state lighting systems typically include different components that are assembled together to complete the final system. For example, the system typically consists of a light engine, an optical component and a power supply. It is not uncommon for a customer assembling a lighting system to have to go to many different suppliers for each of the individual components, and then assemble the different components, from different manufacturers together. Purchasing the various components from different sources proves to make integration into a functioning system difficult. This non-integrated approach does not allow the ability to effectively package the final lighting system in a lighting fixture efficiently.

The light engine of the solid state light system generally includes an LED soldered to a circuit board. The circuit board is configured to be mounted in a lighting fixture. The lighting fixture includes the power supply to provide power to the LED. Typically, the circuit board is wired to the lighting fixture using wires that are soldered to the circuit board and the fixture. Generally, wiring the circuit board to the light fixture power source requires several wires and connections. Each wire must be individually joined between the circuit board and the lighting fixture.

Wiring the circuit board with multiple wires generally requires a significant amount of time and space. In fixtures where space is limited, the wires may require additional time to connect. Additionally, having multiple wires to connect requires multiple terminations, increasing the time required to connect the LEDs. Moreover, using multiple wires increases the possibility of mis-wiring the lighting system. In particular, LED light fixtures are frequently installed by unskilled labor, thereby increasing the possibility of mis-wiring. Mis-wiring the lighting system may result in substantial damage to the LED. Also, in a system where wires are soldered between the circuit board and the fixture, the wires and circuit boards become difficult to replace.

Furthermore, the light engines typically generate a lot of heat and it is desirable to use a heat sink to dissipate heat from the system. Heretofore, LED manufacturers have had problems designing a thermal interface that efficiently dissipates heat from the light engine.

A need remains for lighting systems that can be powered efficiently. A need remains for lighting systems with LEDs that have adequate thermal dissipation. A need remains for lighting systems with LEDs that are assembled in an efficient and cost-effective manner. A need remains for a lighting system that may be efficiently configured for an end use application.

BRIEF DESCRIPTION OF THE INVENTION

In one embodiment, a light module is provided having a light engine that has an LED package having power terminals.

A base ring assembly holds the light engine. The base ring assembly has a base ring configured to be mounted to a supporting structure. The base ring has a securing feature. The base ring assembly has a contact holder that holds power contacts. The power contacts are spring biased against the power terminals to create a separable power connection with the power terminals. A top cover assembly is coupled to the base ring. The top cover assembly has a collar surrounding the base ring. The top cover assembly has a securing feature that engages the securing feature of the base ring to couple the collar to the base ring. The collar has a cavity and the optical component is received in the cavity. The optical component is positioned to receive light from the LED package and the optical component is configured to emit the light generated by the LED package.

In another embodiment, a light module is provided having a light engine that has an LED package with power terminals. A base ring assembly holds the light engine. The base ring assembly has a base ring configured to be mounted to a supporting structure. The base ring assembly has a contact holder that holds power contacts. The power contacts are electrically connected to the power terminals. A top cover assembly is coupled to the base ring. The top cover assembly has a collar defining a cavity. The top cover assembly has a pressure spring positioned between the collar and the base ring assembly. The pressure spring engages the contact holder to bias the contact holder against the LED package. An optical component is coupled to the collar and received in the cavity. The optical component is positioned to receive light from the LED package, and the optical component is configured to emit the light generated by the LED package.

In a further embodiment, a light module is provided having a light engine that has an LED package with power terminals. A base ring assembly holds the light engine. The base ring assembly has a base ring configured to be mounted to a supporting structure and a securing feature. The base ring assembly has a contact holder that holds power contacts. The power contacts are spring biased against the power terminals to create a separable power connection with the power terminals. A top cover assembly is coupled to the base ring. The top cover assembly has a collar that surrounds the base ring and has a securing feature that engages the securing feature of the base ring to couple the collar to the base ring. The collar has a cavity and an optic holder is movably coupled to the collar. An optical component is held by the optic holder in the cavity. The optical component is positioned to receive light from the LED package. The optical component is configured to emit the light generated by the LED package. The optical component is movable toward and away from the LED package as the optic holder is moved with respect to the collar.

DETAILED DESCRIPTION OF THE INVENTION

Figure 1:
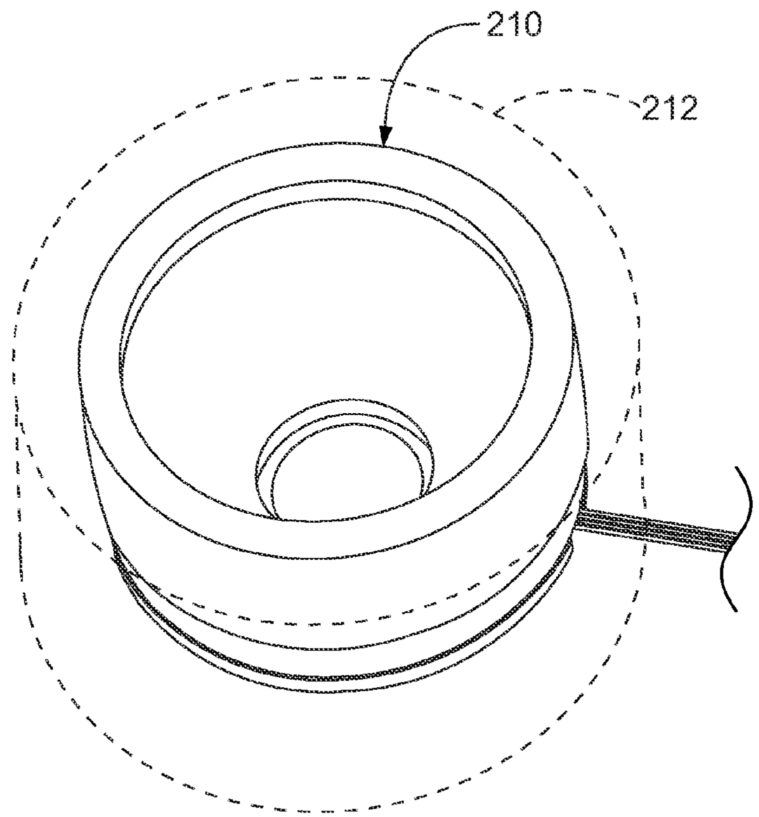
FIG. 1 illustrates a light module formed in accordance with an exemplary embodiment for use in an electronic device.

FIG. 1 illustrates a light module 210 for use in a device 212 (represented schematically in FIG. 1). The light module 210 generates light for the device 212. The device 212 may be any type of lighting device, such as a light fixture. In exemplary embodiment, the device 212 may be a can light fixture, however, the light module 210 may be used with other types of lighting devices in alternative embodiments.

Figure 2:
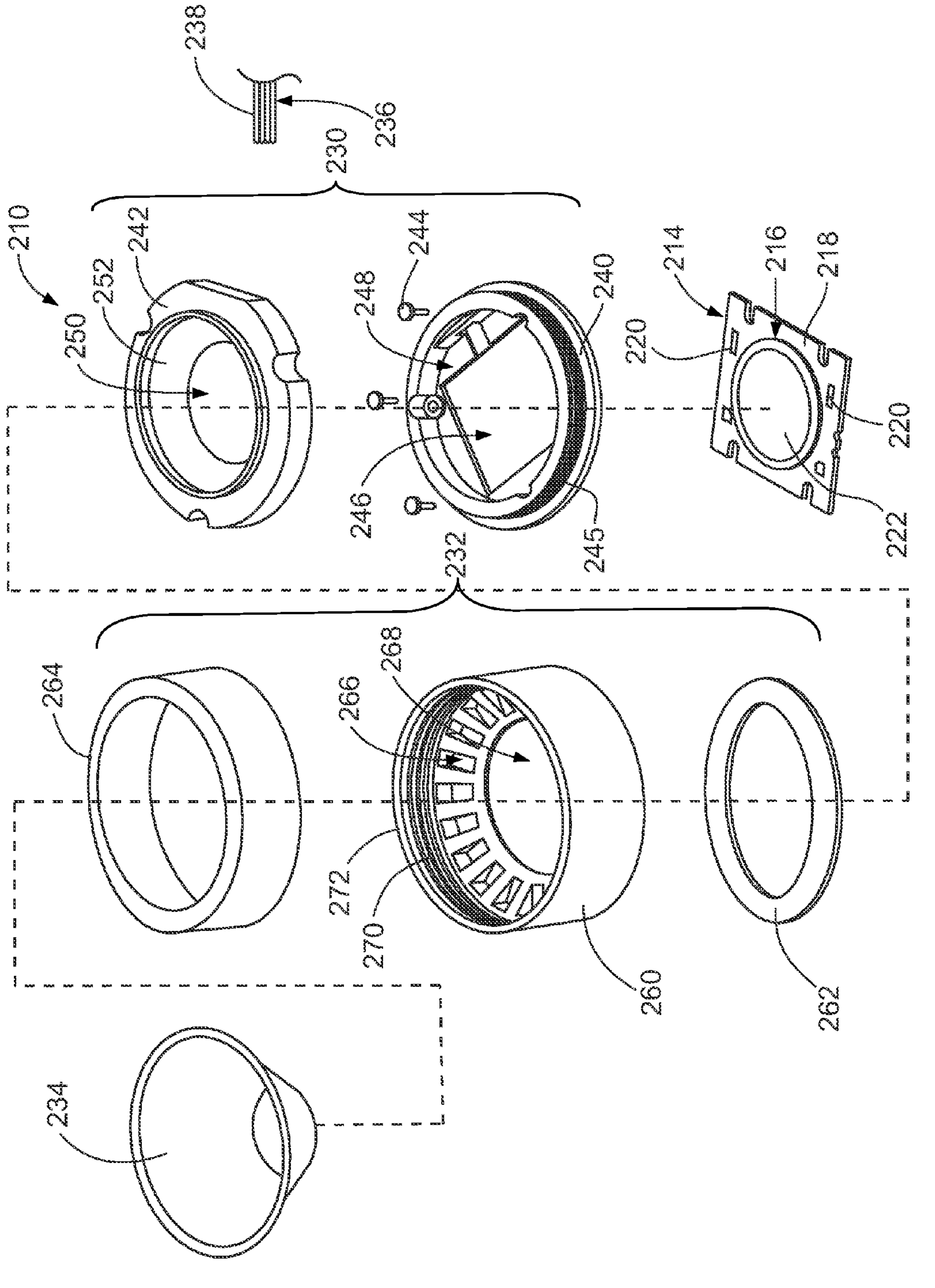
FIG. 2 is an exploded view of the light module shown in FIG. 1.

FIG. 2 is an exploded view of the light module 210. The light module 210 includes a light engine 214 that includes an LED package 216. The LED package 216 has a substrate 218 having a plurality of power terminals 220 on a surface thereof as well as a diode 222 on the surface that is configured to emit light therefrom when the light engine 214 is powered. The diode 222 is a semiconductor in an exemplary embodiment.

The light module 210 includes a base ring assembly 230 that holds the light engine 214. The light module 210 includes a top cover assembly 232 that is configured to be coupled to the base ring assembly 230. The light module 210 includes an optical component 234 that is held by the top cover assembly 232 within the base ring assembly 230. The optical component 234 is positioned to receive light emitted from the LED package 216. For example, the optical component 234 may be held within the base ring assembly 230 adjacent to the LED package 216. In the illustrated embodiment, the optical component 234 constitutes a reflector. The optical component 234 may be a different type of component in an alternative embodiment, such as a lens. In the illustrated embodiment, the reflector is manufactured from a metalized plastic body. Alternatively, the reflector may be manufactured from a metal material. The optical component 234 emits the light generated by the LED package 216 from the light module 210.

The light module 210 includes a power connector 236. The power connector 236 includes a power cable 238. Optionally, an the power connector 236 may include an electrical connector terminated to an end of the power cable 238. The power connector 236 is configured to be electrically connected to the light engine 214 to supply power to the LED package 216.

The base ring assembly 230 includes a base ring 240 and a contact holder 242 held by the base ring 240. The base ring 240 is configured to be secured to another structure, such as the device 212. The base ring 240 may be secured to the structure using fasteners 244, which may be threaded fasteners or other types of fasteners in alternative embodiments. Optionally, the structure of the base ring 240 is secured to may be a heat sink that is configured to dissipate heat generated by the light engine 214. The base ring 240 includes one or more securing features 245 used to secure the top cover assembly 232 to the base ring assembly 230. In the illustrated embodiment, the securing feature 245 constitutes external threads on the base ring 240. Other types of securing features may be utilized in alternative embodiments, such as a recess track, a protrusion, a fastener, a latch, and the like.

The base ring 240 includes an opening 246 in a bottom thereof. The opening 246 receives the LED package 216. With the opening 246 being open at the bottom, the LED 216 is configured to be seated on the heat sink or other structure that the base ring 240 is mounted to. The LED package 216 may be loaded into the opening 246 from the top and/or the bottom. In an exemplary embodiment, the LED package 216 may be removed from the opening 246 while the base ring 240 remains fastened to the structure on which the base ring 240 is mounted. For example, the LED package 216 may be removed and replaced with a different LED package 216 without removing the base ring 240. The LED package 216 may be replaced when the LED package 216 has failed and/or when a different LED package having a different lighting effect is desired. Optionally, the LED package 216 may be held within the opening 246 by a friction fit. Other types of securing means may be used in alternative embodiments to hold the LED package 216 within the base ring 240. For example, the contact holder 242 may be used to hold the LED package 216 within the base ring 240.

The contact holder 242 is received within a cavity 248 of the base ring 240. The contact holder 242 includes a dielectric body, such as a plastic body, that is received in the base ring 240. Optionally, the contact holder 242 may be held within the cavity 248 by an interference fit. Alternatively, other securing means, such as fasteners, may be used to hold the contact holder 242 within the base ring 240. Optionally, the contact holder 242 may include crush ribs or other features around the out perimeter that engage the base ring 240 to provide an interference fit between the contact holder 242 and the base ring 240. The contact holder 242 includes an opening 250. When the base ring assembly 230 is assembled, the opening 250 is aligned with the diode 222 such that light emitted form the diode 222 may be directed through the opening 250. Optionally, the contact holder 242 may include a slanted wall 252 extending upward and outward from the opening 250. The slanted wall 252 allows the light emitted from the diode 222 to be directed outward from the diode 222 at an angle.

Figure 3:
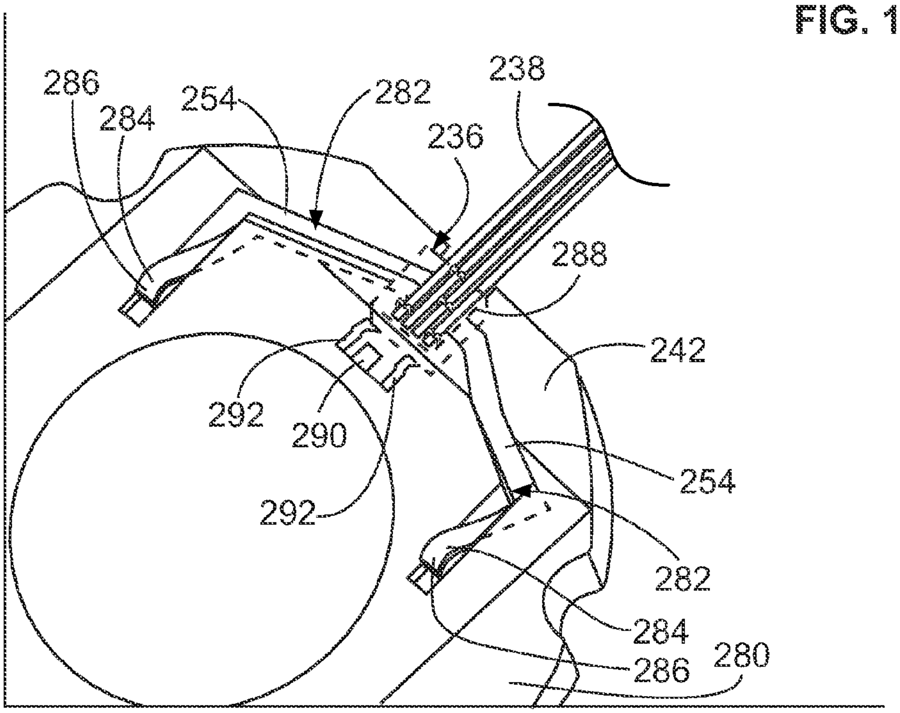
FIG. 3 is a bottom perspective view of a contact holder for the light module shown in FIG. 2.

The contact holder 242 holds a plurality of power contacts 252 (shown in FIG. 3). When the light module 210 is assembled, the power contacts 254 engage the power terminals 220 at the light engine 214. The power contacts 254 are configured to be terminated to the power connector 236. Power is transferred from the power cable 238 to the power contacts 254 through the power connector 236. The power is transferred to the power terminals 220 via the power contacts 254. In an exemplary embodiment, the power contacts 254 are spring biased against the power terminals 220 to create a separable power connection with the power terminals 220. For example, in an exemplary embodiment, the power contacts 254 constitute spring contacts that impart a spring force against the power terminals 220. In an exemplary embodiment, the contact holder 242 is spring biased against the light engine 214, which hold the power contacts 254 against the power terminals 220.

The top cover assembly 232 includes a collar 260 that is configured to be coupled to the base ring assembly 230. For example, the collar 260 may be threadably coupled to the base ring 240. The top cover assembly 232 includes a pressure spring 262 configured to be positioned between the collar 260 of the top cover assembly 232 and the base ring assembly 230. The top cover assembly 232 includes an optic holder 264 that holds the optical component 234. The optic holder 264 is configured to be coupled to the collar 260. In an exemplary embodiment, the optic holder 264 is movably coupled to the collar 260 such that the relative position of the optic holder 264 may be changed with respect to the position of the collar 260. As such, the position of the optical component 234 may be change with respect to the collar 260.

The collar 260 includes a body defining a cavity 266. The body of the collar 260 may be manufactured from a dielectric material, such as a plastic material. Alternatively, the body of the collar 260 may be manufactured from another material, such as a metal material. The collar 260 has an opening 268 at a bottom of the cavity 266. When the light module 210 is assembled, the opening 268 is aligned with a diode 222 and the opening 250 of the contact holder 242 to allow light emitted from the diode 222 to be emitted from the light module 210.

In the illustrated embodiment, the collar 260 has internal threads 270 proximate to a top 272 of the collar 260. The optic holder 264 may include corresponding threads 274 (shown in FIG. 4) that engage the threads 270 to secure the optic holder 264 to the collar 260. The vertical position of the optic holder 264 with respect to the collar 260 may be controlled by rotating the optic holder 264 with respect to the collar 260. For example, rotation of the optic holder 264 in one direction, such as a clockwise direction, may lower the optic holder 264 into the cavity 266. Rotation of the optic holder 264 in the opposite direction, such as in the counter-clockwise direction, raises the position of the optic holder 264 within the cavity 266. As such, the position of the optical component 234 may be raised or lowered by rotating the optic holder 264 in one direction or the other. Changing the position of the optical component 234 with respect to the diode 222 may have an effect on the light output from the light module 210. For example, the angle of illumination of the light emitted from the light module 210 may be increased or decreased by positioning the optical component 234 further from, or closer to, the diode 222.

FIG. 3 is a bottom perspective view of the contact holder 242 with the power connector 236 connected thereto. The contact holder 242 has a bottom surface 280 and a plurality of channels 282 formed therein that are open at the bottom surface 280. The power contacts 254 are received in corresponding channels 282 and are exposed at the bottom surface 280. When the contact holder 242 is loaded into the base ring 240 (shown in FIG. 2), the bottom surface 280 engages the LED package 216 (shown in FIG. 2) and the power contacts 254 engage the power terminals 220 (shown in FIG. 2) through the bottom surface 280.

In the illustrated embodiment, the power contacts 254 include spring beams 284 having mating interfaces 286 thereon. The mating interfaces 286 are configured to engage the power terminals 220 when mounted thereto. The spring beams 284 may be deflected when the contact holder 242 is mounted to the LED package 216. Such deflection causes the spring beams 284 to be spring biased against the power terminals 220 to provide a spring force against the power terminals 220.

The ends of the power contacts 254 opposite the mating interfaces 286 are configured to be terminated to corresponding wires of the power cable 238. In the illustrated embodiment, the power contacts 254 have insulation displacement contacts 288 at the ends thereof that are electrically connected to the wires of the power cable 238. The power contacts 254 may be electrically connected to the wires of the power cable 238 using different types of electrical connections. For example, the wires may be soldered to the power contacts 254. The wires of the power cable 238 may include mating contacts at the ends thereof that are electrically connected to the power contacts 254. A circuit board may be used with the power contacts 254 being terminated to the circuit board and the individual wires of the power cable 238 being terminated to the circuit board.

In an exemplary embodiment, a temperature sensor 290 is held by the contact holder 242. The temperature sensor 290 is electrically connected to wires of the power cable 238 by temperature sensor contacts 292. In the illustrated embodiment, the temperature sensor 290 constitutes a compositor that is configured to be electrically connected to the LED package 216 to monitor a temperature the LED package 216 and/or the diode 222. The temperature sensor 290 is exposed at the bottom surface 280 for mounting to the LED package 216.

Figure 4:
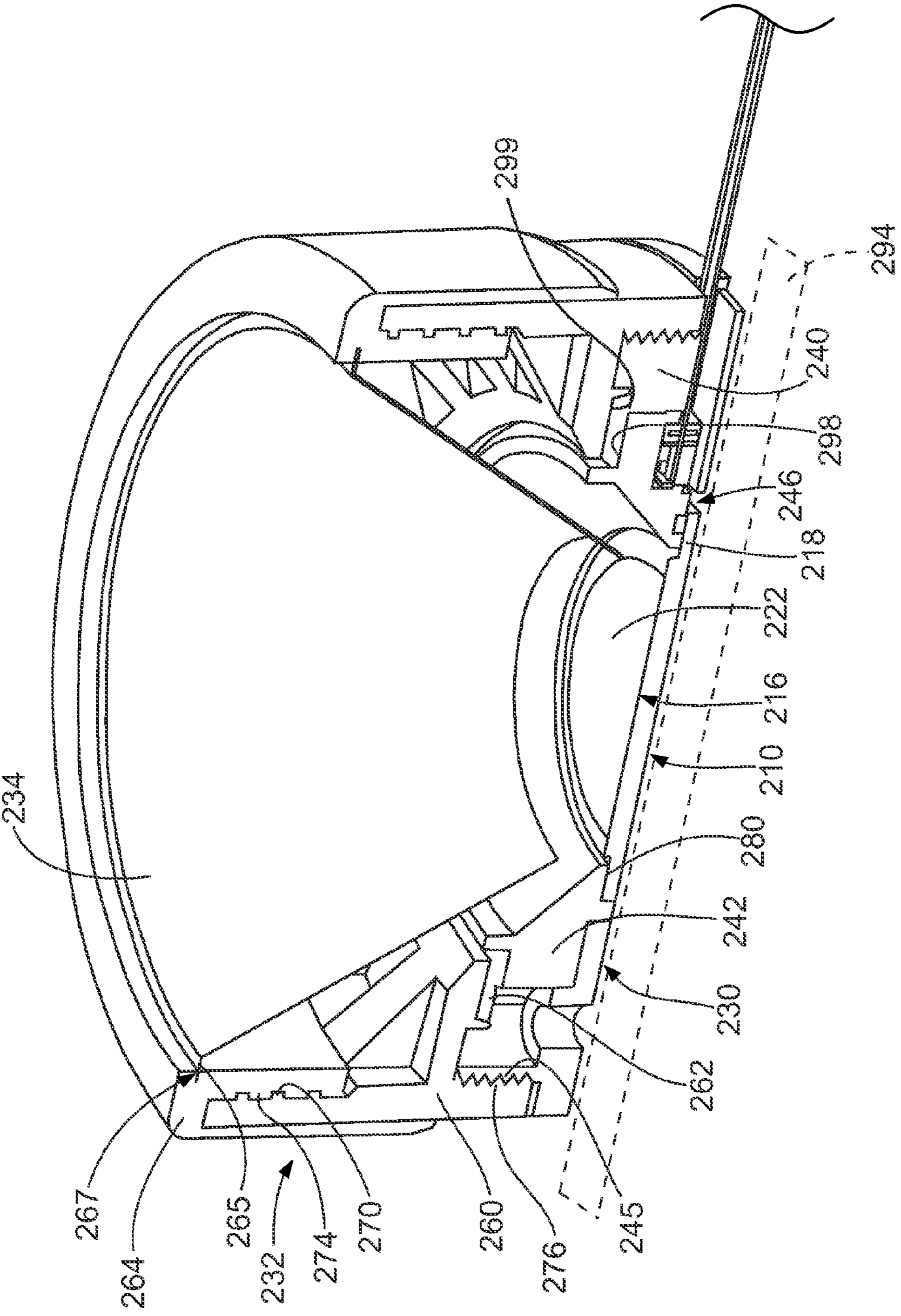
FIG. 4 is a partial sectional view of the light module in an assembled state.

FIG. 4 is a partial sectional view of the light module 210 in an assembled state. The light module 210 is illustrated mounted to a heat sink 294. During assembly, the base ring 240 is mounted to the heat sink 294. The LED package 216 is loaded into the contact holder 242 such that the bottom surface 280 of the contact holder 242 engages the substrate 218. Alternatively, the LED package 216 may be loaded into the opening 246 in the base ring 240 rather than being loaded into the contact holder 242. The contact holder 242 and LED package 216 are then loaded into the base ring 240 from above the base ring 240. The pressure spring 262 is then mounted on top of the contact holder 242. The pressure spring 262 extends circumferentially around the top of the contact holder 242. Optionally, the contact holder 242 may include a ledge 298 that receives the pressure spring 262. The top cover assembly 232 is then coupled to the base ring assembly 230.

In an exemplary embodiment, the collar 260 is coupled to the base ring 240. The securing feature 245 of the base ring assembly 230 is coupled to the securing feature 276 of the top cover assembly 232 to secure the top cover assembly 232 to the base ring assembly 230. In the illustrated embodiment, the securing feature 245 of the base ring assembly 230 constitutes external threads on the base ring 240. The securing feature 276 of the top cover assembly 230 constitutes internal threads on the collar 260. The collar 260 is tightened onto the base ring 240 by rotating the collar 260 in a tightening direction. As the collar 260 is tightened, a ledge 299 of the collar 260 engages the pressure spring 262. Further tightening of the collar 260 compresses the pressure spring 262, which forces the pressure spring 262 into the contact holder 242. The pressure exerted on the contact holder 242 by the pressure spring 262 drives the contact holder 242 downward into the heat sink 294. The bottom surface 280 of the contact holder 242 presses against the LED package 216 and drives the LED package 216 into the heat sink 294. The pressure exerted on the contact holder 242 by the pressure spring 262 holds the LED package 216 against the heat sink 294. The pressure spring 262 maintains adequate pressure on the LED package 216 to provide efficient thermal transfer between the LED package 216 and the heat sink 294.

A thermal interface is defined between the heat sink 294 and the bottom of the LED package 216 and heat is transferred from the LED package 216 into the heat sink 294. In an exemplary embodiment, a thermal interface material may be provided between the heat sink 294 and the LED package 216. For example, a thermal epoxy, a thermal grease, or a thermal sheet or film may be provided between the heat sink 294 and the LED package 216. The thermal interface material increases the thermal transfer between the LED package 216 and the heat sink 294. The downward pressure exerted on the LED package 216 by the contact holder 242 maintains a good thermal connection between the LED package 216 and the heat sink 294. The pressure spring 262 is compressed against the contact holder 242 to impart the downward pressure on the contact holder. The pressure spring 262 maintains such downward pressure on the contact holder 242 to force the LED package 216 against the heat sink 294. The pressure spring 262 maintains the needed amount of force on the LED package 216 to hold the LED package 216 in thermal contact with the heat sink 294.

Once the collar 260 is coupled to the base ring 240, the optic holder 264 and the optical component 234 may be coupled to the collar 260. In an exemplary embodiment, a lip 265 of the optical component 234 is received in a slot 267 in the optic holder 264. During assembly, the optic holder 264 is coupled to the collar 260 by threadably coupling the optic holder 264 to the collar 260. The threads 270 engage the threads 274. The amount of rotation of the optic holder 264 with respect to the collar 260 defines the vertical position of the optical component 234 with respect to the diode 222. The optical component 234 is variably positionable with respect to the diode 222 by controlling the position of the optic holder 264 with respect to the collar 260. The position of the optical component 234 with respect to the diode 222 controls the light effect of the light module 210.

Figure 5:
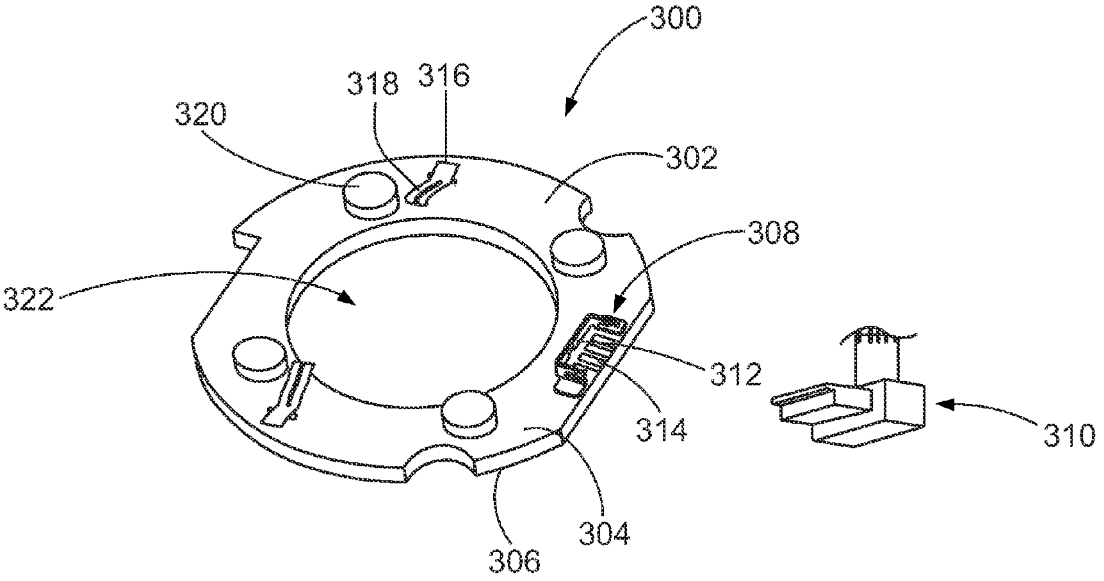
FIG. 5 is a bottom perspective view of an alternative contact holder formed in accordance with an alternative embodiment.

FIG. 5 is a bottom perspective view of an alternative contact holder 300. The contact holder 300 includes a circuit board 302 having a first surface 304 and a second surface 306. The circuit board 302 includes a power connector interface 308 for mating with a power connector 310 provided at the end of a power cable. In the illustrated embodiment, the power connector interface defines a separable interface that allows the power connector 310 to be mated and unmated from the circuit board 302. A clip 312 is provided at the power connector interface 308 to secure the power connector 310 to the circuit board 302. The power connector interface 308 includes contact pads 314 exposed along the first surface 304. The power connector 310 includes individual contacts (not shown) that are mated to the contact pads 314 to provide an electrical connection therebetween. The power connector 310 may be electrically connected to the circuit board 302 in a different manner using different components in an alternative embodiment.

Power contacts 316 are electrically connected to the circuit board 302. In the illustrated embodiment, the power contacts 316 are received in vias extending through the circuit board 302. Alternatively, the power contacts 316 may be surface mounted to the circuit board 302. The power contacts 316 includes spring beams 318 that extend outward from the first surface 304. The spring beams 318 are configured to be deflected and provide a spring force when mated to the power terminals 220 (shown in FIG. 2) of the light engine 214 (shown in FIG. 2). In an exemplary embodiment, the circuit board 302 includes a plurality of stand offs 320 extending from the first surface 304. The stand offs 320 are configured to engage the LED package 216 when mounted thereto. The circuit board 302 includes an opening 322 therethrough. The opening 322 is configured to be aligned with the diode 222 (shown in FIG. 2) such that light emitted from the diode 222 may pass through the circuit board.

Figure 6:
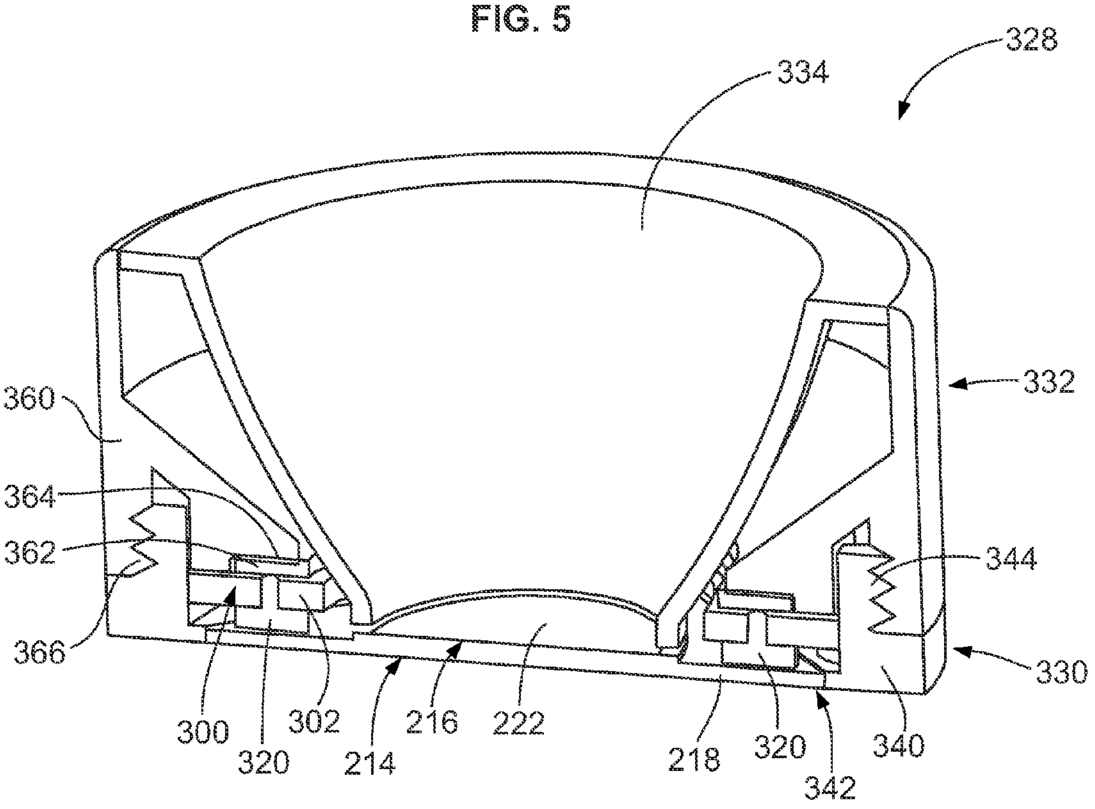
FIG. 6 is a partial sectional view of a light module formed in accordance with an exemplary embodiment.

FIG. 6 is a partial sectional view of a light module 328 formed in accordance with an exemplary embodiment. The light module 328 is configured for use with the light engine 214. Different types of light engines may be used in alternative embodiments. The light module 328 includes a base ring assembly 330 and a top cover assembly 322 that cooperate to hold an optical component 334 with respect to the light engine 214. Light emitted from the diode 220 is emitted into the optical component 334 and is emitted from the light module 328 by the optical component 334.

The base ring assembly 330 includes a base ring 340 and the contact holder 300. The base ring 340 is configured to be mounted to another structure, such as a heat sink. The base ring 340 holds the contact holder 300. The base ring 340 also holds the LED package 216. In an exemplary embodiment, the base ring 340 includes an opening 342 that receives the LED package 216 therein. Optionally, the LED package 216 may be held by an interference fit within the opening 342 to generally maintain a position of the LED package 216 within the base ring 340, such as during assembly of the light module 328 and/or mounting of the light module 328 to the heat sink. The base ring 340 includes securing features 344 for securing the top cover assembly 332 to the base ring assembly 330. In an exemplary embodiment, the securing features 344 constitute external threads on the base ring 340. Other types of securing features may be used in alternative embodiments.

The top cover assembly 332 includes a collar 360 and a pressure spring 362 that is configured to be positioned between the top cover assembly 332 and the base ring assembly 330. The collar 360 functions as an optic holder for holding the optical component 334. In an exemplary embodiment, the optical component 334 is coupled to the collar 360 and is secured thereto in a fixed position with respect to the collar 360. Alternatively, an additional component such as an optical holder may be provided to hold the optical component 334, wherein the optic holder is movable with respect to the collar 360 to change the position of the optical component 334 with respect to the collar 360.

The collar 360 includes a ledge 364 that receives the pressure spring 362. When assembled, the pressure spring 362 is held between the ledge 364 and the contact holder 300. The pressure spring 362 exerts a downward pressure force on the contact holder 300 which forces the contact holder 300 into the LED package 216. The downward pressure force created by the pressure spring 362 helps hold the LED package 216 against the heat sink. In the illustrated embodiment, the pressure spring 362 constitutes a wave spring that extends between the ledge 364 and the contact holder 300 in a wavy configuration. Other types of springs may be used in alternative embodiments to create a downward pressure force against the contact holder.

In an exemplary embodiment, the top cover assembly 332 includes a securing feature 366. In the illustrated embodiment, the securing feature 366 constitutes internal threads on the collar 360. Other types of securing features may be used in alternative embodiments. The securing features 366 engage the securing feature 344 of the base ring assembly 330 to secure the top cover assembly 332 to the base ring assembly 330. For example, during assembly the collar 360 is rotatably coupled to the base ring 340 with the threads of the securing feature 366 engaging the threads of the securing feature 344. As the collar 360 is tightened, the ledge 364 presses down on the pressure spring 362 to force the pressure spring 362 to be compressed against the circuit board 302 of the contact holder 300. Such compression exerts a spring force onto the contact holder 300 which drives the contact holder 300 downward toward the LED package 216. The stand offs 320 extend between the circuit board 302 and the substrate 218 of the LED package 216. The downward pressure of the pressure spring 362 is transferred into the LED package 216 by the stand offs 320. The pressure spring 362 maintains adequate pressure on the LED package 216 to provide efficient thermal transfer between the LED package 216 and the heat sink. The downward pressure holds the LED package 216 against the heat sink to ensure good thermal transfer there between.

Figure 7:
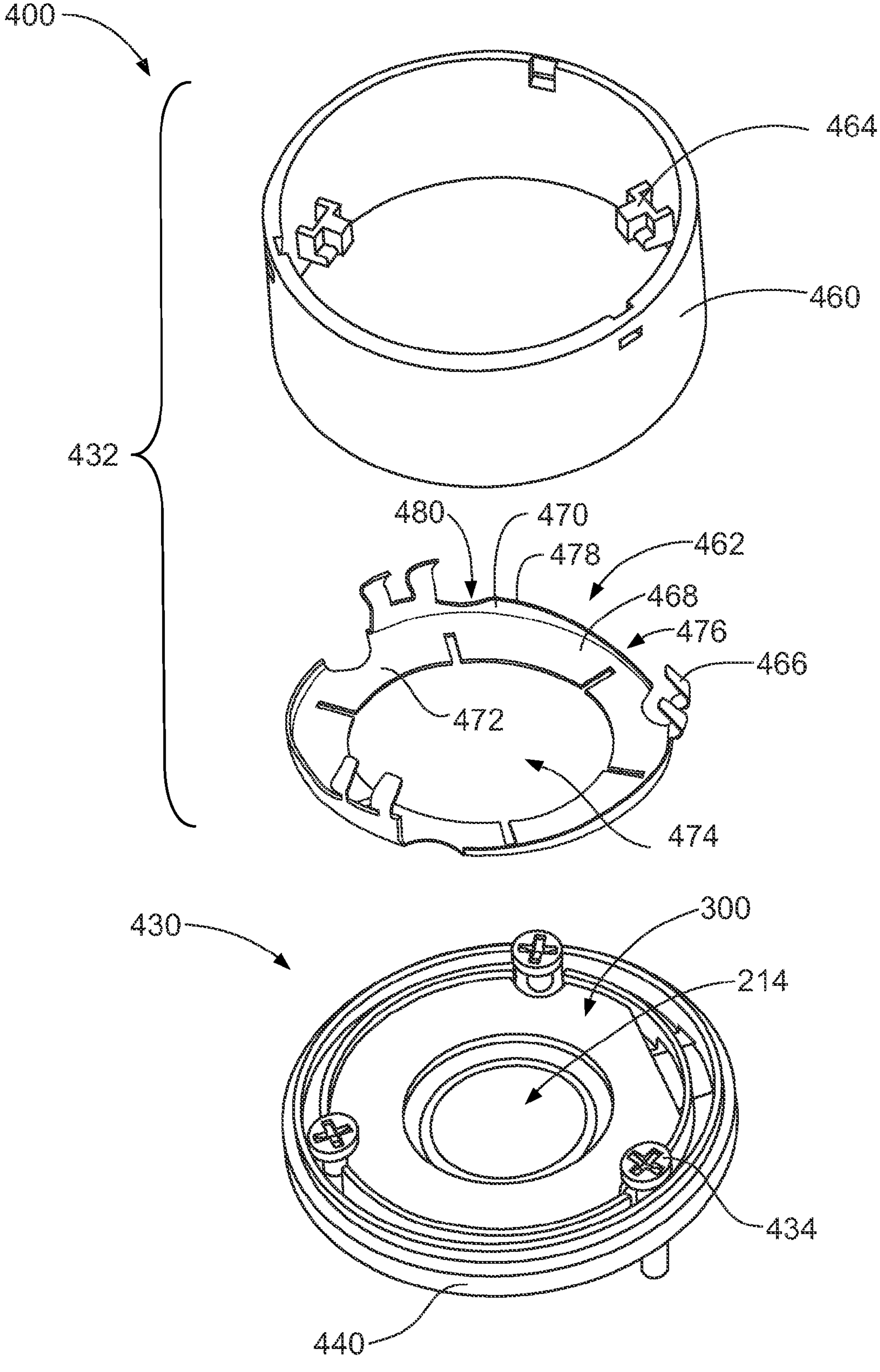
FIG. 7 is an exploded view of another alternative light module.

FIG. 7 is an exploded view of an alternative light module 400. The light module 400 is used with the light engine 214 in the contact holder 300. Other types of light engines may be used in alternative embodiments. Additionally, other types of contact holders may be used in alternative embodiments.

The light module 400 includes a base ring assembly 430 and a top cover assembly 432. The top cover assembly 432 is configured to be coupled to the base ring assembly 430. The base ring assembly 430 is configured to be mounted to another structure, such as a heat sink. The base ring assembly 430 holds the light engine 214. The base ring assembly 430 may be coupled to the heat sink using fasteners 434. Other types of securing means may be used in alternative embodiments. The top cover assembly 432 is configured to hold an optical component 436 (shown in FIG. 9). In the illustrated embodiment, the optical component 436 constitutes a reflector, however, other types of optical components may be utilized within the light module 400 in alternative embodiments.

The base ring assembly 430 includes a base ring 440 that is configured to be mounted to the heat sink. The base ring assembly 430 also includes the contact holder 300. The light engine 214 and the contact holder 300 are received in the base ring 440 and secured thereto. The base ring assembly 430 also includes the fasteners 434. Optionally, the fasteners 434 may be used to hold the light engine 214 against the heat sink. In the illustrated embodiment, the fasteners 434 constitute securing features for securing the top cover assembly 432 to the base ring assembly 430. The fasteners 434 may be referred to hereinafter as securing features 434. Other types of securing features may be utilized in alternative embodiments. For example, the securing features may constitute threads, a bayonet type securing feature, or other components that secure the top cover assembly 432 to the base ring assembly 430.

The top cover assembly 432 includes a collar 460 and a pressure spring 462. The collar 460 includes mounting features 464 and the pressure spring 462 includes mounting features 466 that engage the mounting features 464 of the collar 460 to secure the pressure spring 462 to the collar 460. The pressure spring 462 includes a spring plate 468 and side walls 470 extending upward from the spring plate 468. The mounting features 466 extend from the side walls 470. In an exemplary embodiment, the spring plate 468 includes a plurality of spring elements 472 that extend circumferentially around an opening 474. Each of the spring elements 472 is separate from one another and individually deflectable. For example, slits are cut in the spring plate 468 to define the spring elements 472. When assembled, the spring elements 472 engage the contact holder 300 and provide a spring force on the contact holder 300 to force the contact holder 300 against the light engine 214. The downward pressure on the light engine 214 maintains a thermal interface between the light engine 214 and the heat sink. The pressure spring 462 provides the downward force to hold the light engine 214 in thermal contact with the heat sink to ensure good thermal transfer therebetween.

In an exemplary embodiment, the pressure spring 462 includes one or more securing features 476 used to secure the top cover assembly 432 to the base ring assembly 430. For example, the securing features 476 are configured to engage the securing features 434 of the base ring assembly 430. In the illustrated embodiment, the securing features 476 constitute bayonet type connectors that are configured to engage the fasteners 434. The bayonet type connectors are defined by the side walls 470. The side walls 470 are ramped upward and have a non uniform height measured from the spring plate 468. The side walls 470 have a notch 480 formed therein at the end of the ramp surface 478. The fastener 434 is retained within the notch 480 when the top cover assembly 432 is mated with the base ring assembly.

Figure 8:
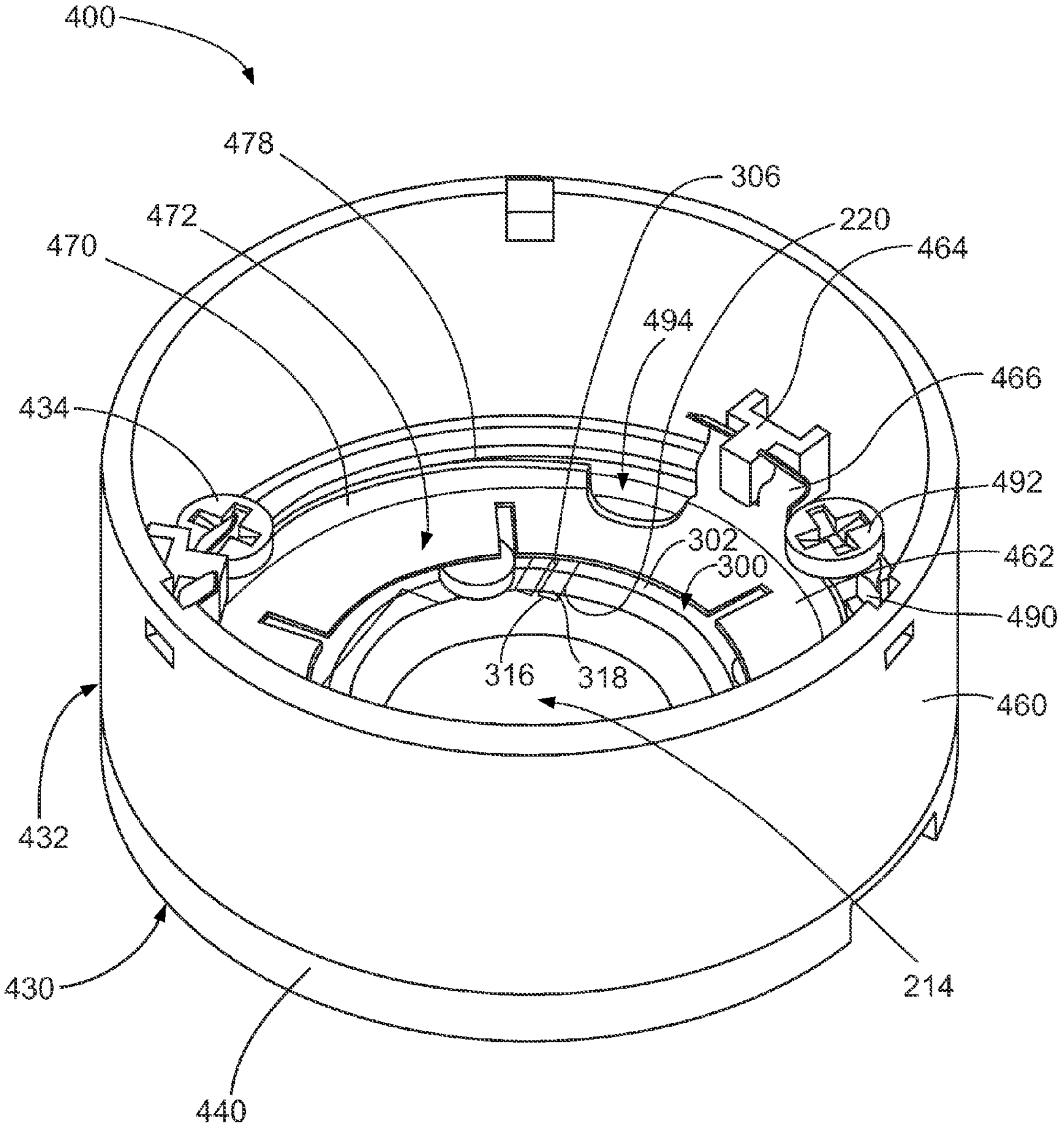
FIG. 8 is top perspective view of the light module shown in FIG. 7 in an assembled state.
Figure 9:
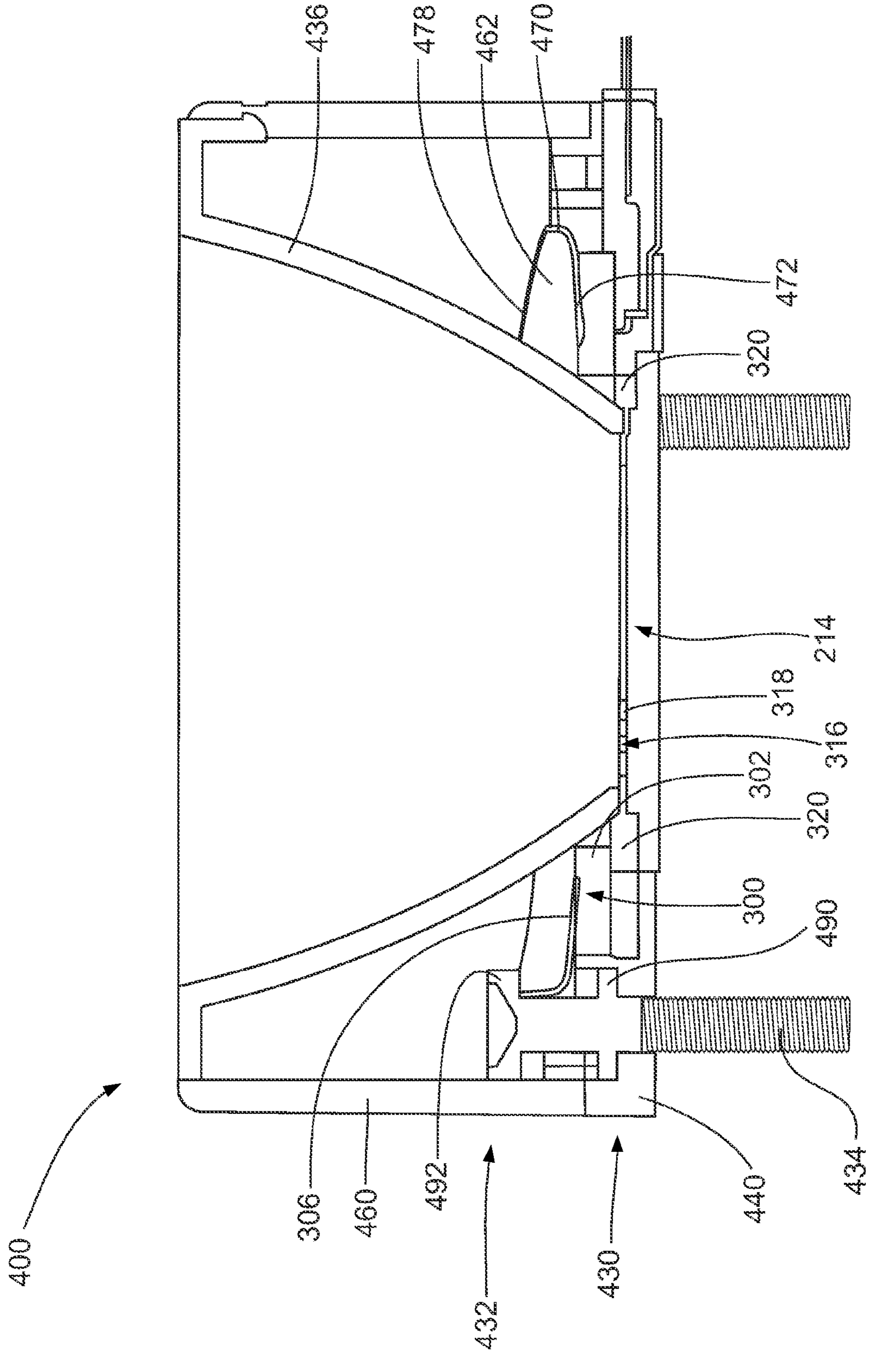
FIG. 9 is a sectional view of the light module shown in FIG. 7 in an assembled state.

FIG. 8 is top perspective view of the light module 400 in an assembled state. FIG. 9 is a sectional view of the light module 400 in an assembled state. During assembly, the base ring assembly 430 is mounted to the heat sink or other supporting structure. The light engine 214 and the contact holder 300 are held within the base ring 440. The base ring 440 is secured to the heat sink using the fasteners 434. In the illustrated embodiment, the fasteners 434 are threaded fasteners configured to be threadably coupled to the heat sink. The fasteners 434 are double headed fasteners having a lower head 490 and an upper head 492. A space is created between the lower and upper heads 490, 492. The upper head 492 is positioned above the base ring 440.

The top cover assembly 432 is assembled by coupling the pressure spring 462 to the collar 460 using the mounting features 464, 466. The optical component 436 may be coupled to the top cover assembly 432 prior to, or after, the top cover assembly 432 is coupled to the base ring assembly 430.

During assembly, the top cover assembly 432 is lowered onto the base ring assembly 430 with the upper head 492 passing through a cut out 494 in the pressure spring 462. The top cover assembly 432 is loaded onto the base ring assembly 430 until the pressure spring 462 rests on the contact holder 300. The top cover assembly 432 is then rotated, such as in a clockwise direction, to a locked position. As the top cover assembly 432 is rotated, the ramp surface 478 engages the upper head 492. The top cover assembly 432 is rotated until the upper head 492 is received in the notch 480 in the side wall 470.

During assembly, as the ramp surface 478 is rotated along the upper head 492, the pressure spring 462 is forced downward. For example, the spring elements 472 are forced downward toward the contact holder 300. The individual spring elements 472 engage the second surface 306 of the circuit board 302. The spring elements 472 are deflected when the spring elements 472 engage the circuit board 302. Such deflection exerts a spring force on the circuit board 302 forcing the circuit board 302 toward the light engine 214. The spring force puts a downward pressure on the circuit board 302, which is transferred to the light engine 214. The downward pressure holds the light engine 214 against the heat sink. The downward pressure is transferred from the circuit board 302 to the light engine 214 by the stand offs 320. The amount of downward pressure on the circuit board 302 from the pressure spring 462 is adequate to ensure good thermal contact between the light engine 302 and the heat sink. The downward spring force from the pressure spring 462 also forces the circuit board 302 toward light engine 214 to hold the power contacts 316 in position for mating with the power terminals (shown in FIG. 2). As such, the power contacts 316 are spring biased against the power terminals 220 to create a power connection with the power terminals 220.

The power contacts 316 include the spring beams 318 that are spring biased against the power terminals 220 to create a power connection with the power terminals 220. The power contacts 316 are connected to the power terminals 220 at a separable interface. For example, a nonpermanent connection is made between the power contacts 316 and the power terminals 220. No solder is required to create an electrical connection between the power contacts 316 and the power terminals 220.

In an exemplary embodiment, the light module 400 may be disassembled to repair or replace various components of the light module. For example the top cover assembly 432 may be removed to replace the circuit board 302 and/or the light engine 214. The base ring 440 may remain coupled to the heat sink while the circuit board 302 and/or the light engine 214 may be replaced.

Figure 10:
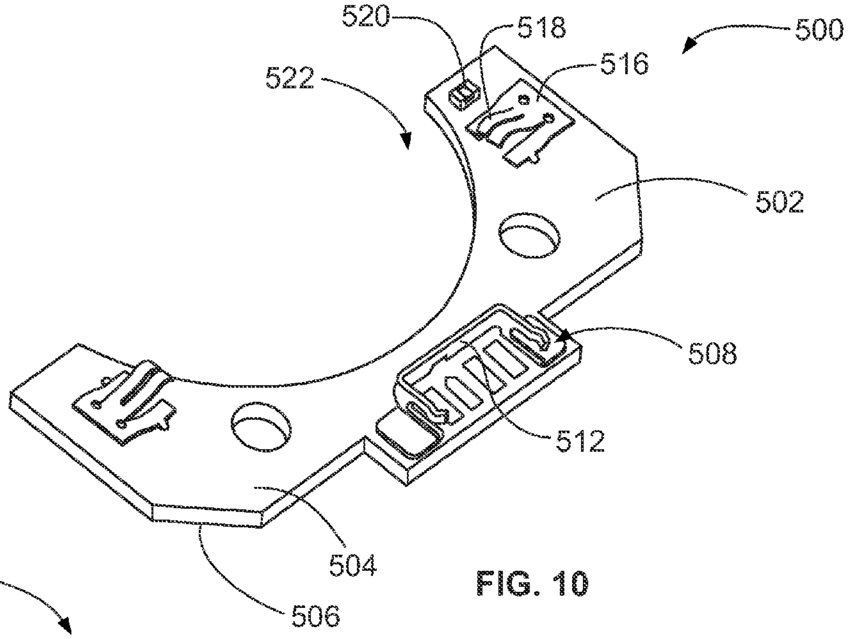
FIG. 10 is a bottom perspective view of an alternative contact holder formed in accordance with an exemplary embodiment.

FIG. 10 is a bottom perspective view of an alternative contact holder 500. The contact holder 500 includes a circuit board 502 having a first surface 504 and a second surface 506. The circuit board 502 includes a power connector interface 508 for mating with a power connector provided at the end of a power cable. In the illustrated embodiment, the power connector interface defines a separable interface that allows the power connector to be mated and unmated from the circuit board 502. A clip 512 is provided at the power connector interface 508 to secure the power connector to the circuit board 502. A power connector may be electrically connected to the circuit board 502 in a different manner using different components in an alternative embodiment.

Power contacts 516 are electrically connected to the circuit board 502. In the illustrated embodiment, the power contacts 516 are received in vias extending through the circuit board 502. Alternatively, the power contacts 516 may be surface mounted to the circuit board 502. The power contacts 516 includes spring beams 518 that extend outward from the first surface 504. The spring beams 518 are configured to be deflected and provide a spring force when mated to the power terminals 220 (shown in FIG. 2) of the light engine 214 (shown in FIG. 2).

One or more electronic component(s) 520 are mounted to the circuit board 502. The electronic component(s) 520 may control a power scheme of the circuit board 502. Optionally, the electronic component 520 may be a temperature sensor. Other types of electronic components may be used in alternative embodiments. The electronic component 520 may be a microprocessor or other type of controller for controlling the lighting. The circuit board 502 includes an opening 522 along one side thereof. The opening 522 is configured to be aligned with the diode 222 (shown in FIG. 2) such that light emitted from the diode 222 may pass through the circuit board 502.

Figure 11:
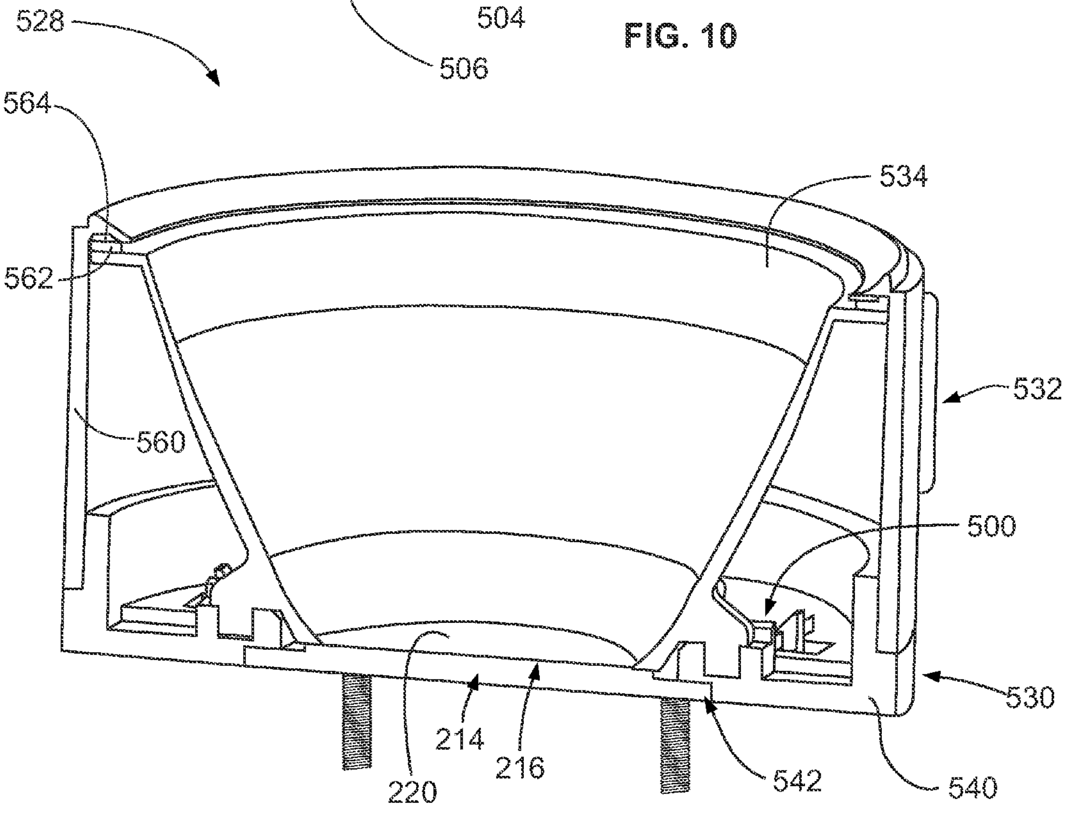
FIG. 11 is a partial sectional view of a light module formed in accordance with an exemplary embodiment that holds the contact holder shown in FIG. 10.

FIG. 11 is a partial sectional view of a light module 528 formed in accordance with an exemplary embodiment. The light module 528 is configured for use with the light engine 214. Different types of light engines may be used in alternative embodiments. The light module 528 includes a base ring assembly 530 and a top cover assembly 532 that cooperate to hold an optical component 534 with respect to the light engine 214. Light emitted from the diode 220 is emitted into the optical component 534 and is emitted from the light module 528 by the optical component 534.

The base ring assembly 530 includes a base ring 540 and the contact holder 500. The base ring 540 is configured to be mounted to another structure, such as a heat sink. The base ring 540 holds the contact holder 500. The base ring 540 also holds the LED package 216. In an exemplary embodiment, the base ring 540 includes an opening 542 aligned with the LED package 216. The base ring 540 is mounted over the LED package 216 such that the opening 542 is aligned with the diode 220.

The top cover assembly 532 includes a collar 560 and a pressure spring 562 that is configured to be positioned between the top cover assembly 532 and the optical component 534. The collar 560 functions as an optic holder for holding the optical component 534. In an exemplary embodiment, the optical component 534 is coupled to the collar 560 and is secured thereto in a fixed position with respect to the collar 560. Alternatively, an additional component such as an optical holder may be provided to hold the optical component 534, wherein the optic holder is movable with respect to the collar 560 to change the position of the optical component 534 with respect to the collar 560.

The collar 560 includes a ledge 564 that receives the pressure spring 562. When assembled, the pressure spring 562 is held between the ledge 564 and the optical component 534. The pressure spring 562 exerts a downward pressure force on the optical component 534 which forces the optical component 534 into the LED package 216. The downward pressure force created by the pressure spring 562 helps hold the LED package 216 against the heat sink. As the collar 560 is tightened, the ledge 564 presses down on the pressure spring 562 to force the pressure spring 562 to be compressed against the optical component 534. In the illustrated embodiment, the pressure spring 562 constitutes a wave spring that extends between the ledge 564 and the optical component 534. Other types of springs may be used in alternative embodiments to create a downward pressure force against the contact holder.

Figure 12:
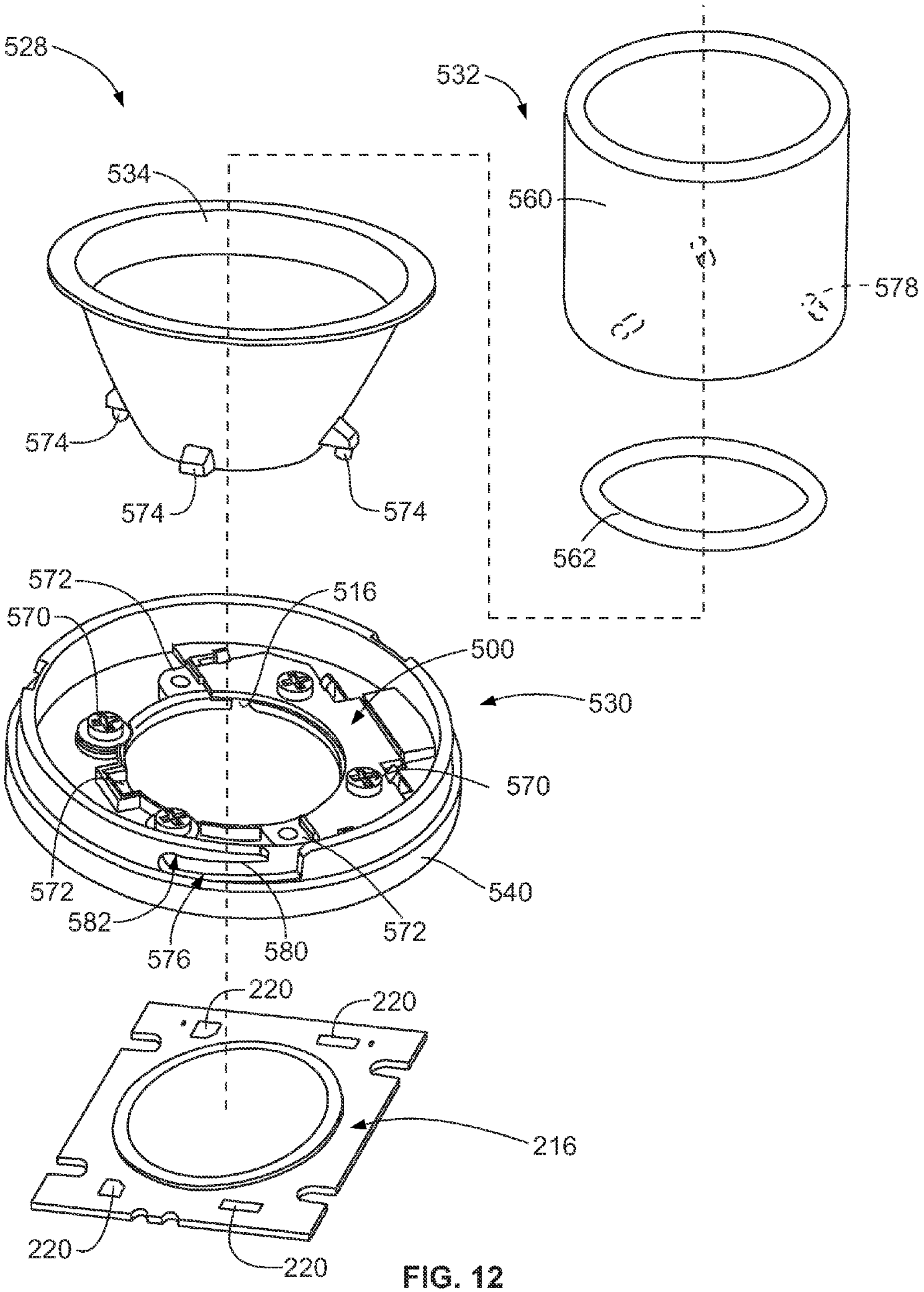
FIG. 12 is an exploded view of the light module shown in FIG. 11.

FIG. 12 is an exploded view of the light module 528. The contact holder 500 is illustrated loaded into the base ring 540. The contact holder 500 is secured within the base ring 540 using fasteners 570. When the fasteners 570 are tightened, the contact holder 500 and base ring 540 press down onto the LED package 216. The power contacts 516 are biased against the power terminals 220.

The base ring assembly 530 includes mounting features 572 that receive corresponding mounting features 574 of the optical component 534. In the illustrated embodiment, the mounting features 572 constitute openings that are sized, shaped and positioned to receive complementary mounting features 574. The mounting features 572 orient the optical component 534 with respect to the base ring 540.

The base ring assembly 530 includes securing features 576 used to secure the top cover assembly 532 thereto. The top cover assembly 532 includes complementary securing features 578 that engage the securing features 576 to secure the top cover assembly 532 to the base ring assembly 530. In the illustrated embodiment, the securing features 576, 578 define a bayonet-style coupling. The securing features 576 constitute recessed tracks formed in the side wall of the base ring 540. The securing features 578 constitute protrusions extending inward from the side wall of the collar 560 that are configured to be received in the recessed tracks to secure the top cover assembly 532 to the base ring assembly 530. Alternatively, the securing feature 576 may constitute a protrusion extending out from the side wall and the securing feature 578 may constitute a recessed track in the inner surface of the side wall of the collar 560. Other types of securing features 576, 578 may be used in alternative embodiments. For example, the securing features 576, 578 may constitute threads on the side walls that allow threaded coupling between the collar 560 and the base ring 540. Other examples of securing features 576, 578 include latches, pins, fasteners, and the like that are used to secure the collar 560 with respect to the base ring 540.

In an exemplary embodiment, the securing feature 576 includes a cam surface 580 and a locking notch 582 at an end of the cam surface 580. The cam surface 580 is angled such that as the top cover assembly 532 is rotated in a mating direction, the securing feature 578 rides along the cam surface 580. As the securing feature 578 rides along the cam surface 580, the top cover assembly 532 is drawn downward onto the base ring assembly 530. As the top cover assembly 532 is drawn downward, the pressure spring 562 is compressed against the optical component 534.

During assembly, the top cover assembly 532 is rotated in the mating direction until the securing feature 578 is received in the locking notch 582. The locking notch 582 is notched upward from the cam surface 580 to provide a space that receives the securing feature 578. When the securing feature 578 is received in the locking notch 582, rotation of the top cover assembly 532 in an unmating direction, generally opposite to the mating direction, is restricted.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase “means for” followed by a statement of function void of further structure.

What is claimed is:

1. A light module comprising:

a light engine having an LED package having power terminals;

a base ring assembly holding the light engine, the base ring assembly having a base ring configured to be mounted to a supporting structure, the base ring having a securing feature, the base ring assembly having a contact holder holding power contacts, the base ring assembly holding the light engine such that the LED package is positioned between the contact holder and the supporting structure, the power contacts being spring biased against the power terminals to create a separable power connection with the power terminals;

a top cover assembly coupled to the base ring, the top cover assembly having a collar surrounding the base ring, the top cover assembly having a securing feature engaging the securing feature of the base ring to couple the collar to the base ring, the collar having a cavity; and an optical component received in the cavity, the optical component being positioned to receive light from the LED package, the optical component being configured to emit the light generated by the LED package.

2. The light module of claim 1, wherein the contact holder comprises a circuit board having a separable power connector interface configured to be electrically connected to a power connector, the circuit board holding the power contacts, the power contacts being electrically connected to the power connector interface by circuits of the circuit board.

3. The light module of claim 1, wherein the power contacts comprise spring beams having mating interfaces engaging the power terminals, the spring beams being biased against the power terminals to provide a spring force against the power terminals.

4. The light module of claim 1, wherein the contact holder comprises a dielectric body having a bottom surface, the dielectric body having channels formed therein open at the bottom surface, the power contacts being received in corresponding channels and being exposed at the bottom surface, the bottom surface engaging the LED package and the power contacts engaging the power terminals through the bottom surface to force a bottom of the LED package against the support structure for direct heat dissipation from the LED package into the support structure.

5. The light module of claim 1, further comprising a pressure spring positioned between the top cover assembly and the base ring assembly, the pressure spring providing a biasing force on the contact holder in a direction of the LED package to force the contact holder toward the LED package.

6. The light module of claim 1, further comprising a pressure spring positioned between the top cover assembly and the base ring assembly, the pressure spring engaging the contact holder, the contact holder engaging the LED package, the pressure spring forcing the contact holder into the LED package to force the LED package against the support structure defining a heat sink.

7. The light module of claim 1, wherein the contact holder comprises a circuit board separate and distinct from the LED package, the power contacts interconnecting the circuit board and the LED package, the contact holder having stand offs engaging the LED package, wherein pressure on the circuit board in the direction of the LED package is transferred to the LED package by the stand offs.

8. The light module of claim 1, wherein the securing features engage one another to threadably couple the top cover assembly to the base ring assembly.

9. The light module of claim 1, wherein the top cover assembly has an optic holder movably coupled to the collar, the optical component being held by the optic holder, the optical component being movable toward and away from the LED package as the optic holder is moved with respect to the collar.

10. The light module of claim 1, wherein the securing feature of the base ring assembly comprises fasteners configured to secure the base ring to another structure, and wherein the securing features of the top cover assembly comprises a pressure spring coupled to the collar, the pressure spring having a bayonet type connection with the fasteners to secure the pressure spring to the fasteners.

11. A light module comprising:

a light engine having an LED package having power terminals;

a base ring assembly holding the light engine, the base ring assembly having a base ring configured to be mounted to a supporting structure, the base ring assembly having a contact holder holding power contacts, the power contacts being electrically connected to the power terminals, the base ring assembly holding the light engine such that the LED package is positioned between the contact holder and the supporting structure;

a top cover assembly coupled to the base ring, the top cover assembly having a collar defining a cavity, the top cover assembly having a pressure spring positioned between the collar and the base ring assembly, the pressure spring engaging the contact holder to bias the contact holder against the LED package to hold the LED package in thermal communication with a heat dissipating component; and an optical component coupled to the collar and received in the cavity, the optical component being positioned to receive light from the LED package, the optical component being configured to emit the light generated by the LED package.

12. The light module of claim 11, where in the pressure spring has spring elements directly engaging the contact holder and forcing the contact holder toward the LED package.

13. The light module of claim 11, wherein the power contacts comprise spring beams having mating interfaces engaging the power terminals, the spring beams being biased against the power terminals to provide a spring force against the power terminals.

14. The light module of claim 11, wherein the contact holder comprises a dielectric body having a bottom surface, the bottom surface engaging the LED package and the pressure spring forcing the bottom surface of the contact holder against the LED package.

15. The light module of claim 11, wherein the contact holder comprises a circuit board separate and distinct from the LED package, the power contacts interconnecting the circuit board and the LED package, the contact holder having stand offs engaging the LED package, wherein pressure on the circuit board in the direction of the LED package is transferred to the LED package by the stand offs.

16. The light module of claim 11, wherein the pressure spring comprises spring elements engaging the contact holder, the pressure spring being forced against the contact holder to impart a downward pressure on the contact holder which is transferred to the LED package to hold the LED package in thermal engagement with the heat dissipating component.

17. The light module of claim 11, wherein the base ring assembly comprises securing features configured to secure the base ring to another structure, and wherein the pressure spring comprises securing features configured to engage the securing features of the base ring assembly, the securing features of the pressure spring defining a bayonet type connection with the securing features of the base ring assembly to secure the pressure spring to the base ring assembly.

18. A light module comprising:

a light engine having an LED package having power terminals;

a base ring assembly holding the light engine, the base ring assembly having a base ring configured to be mounted to a supporting structure, the base ring assembly having a securing feature, the base ring assembly having a contact holder holding power contacts, the power contacts being spring biased against the power terminals to create a separable power connection with the power terminals;

a top cover assembly coupled to the base ring, the top cover assembly having a collar surrounding the base ring and having a securing feature engaging the securing feature of the base ring to couple the collar to the base ring, the collar having a cavity, the top cover assembly having an optic holder movably coupled to the collar; and an optical component held by the optic holder in the cavity, the optical component being positioned to receive light from the LED package, the optical component being configured to emit the light generated by the LED package, the optical component being movable toward and away from the LED package as the optic holder is moved with respect to the collar.

19. The light module of claim 18, wherein the optic holder is rotatably coupled to the collar to adjust a relative position of the optic holder with respect to the collar.

20. The light module of claim 18, wherein the power contacts comprise spring beams having mating interfaces engaging the power terminals, the spring beams being biased against the power terminals to provide a spring force against the power terminals.

* * * * *